(12) United States Patent
Kubintsev et al.

(10) Patent No.: US 9,715,948 B2
(45) Date of Patent: Jul. 25, 2017

(54) REACTOR SYSTEM WITH A LEAD-COOLED FAST REACTOR

(71) Applicant: STATE ATOMIC ENERGY CORPORATION "ROSATOM" ON BEHALF OF THE RUSSIAN FEDERATION, Moscow (RU)

(72) Inventors: Boris Borisovich Kubintsev, Moscow (RU); Viktor Nikolaevich Leonov, Moscow (RU); Aleksandr Viktorovich Lopatkin, Moscow (RU); Yuriy Vasilievich Chernobrovkin, Moscow (RU)

(73) Assignee: State Atomic Energy Corporation "Rosatom" on behalf of The Russian Federation, Moscow (RU)

( * ) Notice: Subject to any disclaimer, the term of this patent is extended or adjusted under 35 U.S.C. 154(b) by 0 days.

(21) Appl. No.: 15/112,548

(22) PCT Filed: Nov. 27, 2014

(86) PCT No.: PCT/RU2014/000896
§ 371 (c)(1),
(2) Date: Jul. 19, 2016

(87) PCT Pub. No.: WO2015/115930
PCT Pub. Date: Aug. 6, 2015

(65) Prior Publication Data
US 2016/0336082 A1    Nov. 17, 2016

(30) Foreign Application Priority Data

Jan. 31, 2014  (RU) ................................ 2014103269

(51) Int. Cl.
*G21C 15/18*    (2006.01)
*G21C 1/03*    (2006.01)
(Continued)

(52) U.S. Cl.
CPC ............... *G21C 15/18* (2013.01); *G21C 1/03* (2013.01); *G21C 15/02* (2013.01); *G21C 15/247* (2013.01);
(Continued)

(58) Field of Classification Search
CPC ... G21C 1/00; G21C 1/02; G21C 1/03; G21C 15/00; G21C 15/02; G21C 15/24;
(Continued)

(56) References Cited

U.S. PATENT DOCUMENTS

| 3,262,856 A | * | 7/1966 | Bettis | G21C 1/02 |
| | | | | 376/171 |
| 3,865,688 A | * | 2/1975 | Kleimola | G21C 9/00 |
| | | | | 376/246 |
| 4,608,224 A | * | 8/1986 | Brachet | G21C 1/03 |
| | | | | 165/104.28 |

FOREIGN PATENT DOCUMENTS

| JP | 2002257967 A | 9/2002 |
| RU | 2247435 C1 | 2/2005 |
| RU | 2473984 C1 | 1/2013 |

OTHER PUBLICATIONS

International Search Report for PCT/RU2014/000896, ISA/RU, with its English translation, mailed Apr. 16, 2015.
(Continued)

*Primary Examiner* — Jack W Keith
*Assistant Examiner* — Sharon M Davis
(74) *Attorney, Agent, or Firm* — Harness, Dickey & Pierce, PLC

(57) ABSTRACT

Steam generators are in the form of tubular heat exchangers in which molten lead coolant flows within the pipes, while the water-steam flows in a space between the pipes, the steam generators are arranged in separate boxes and communicate with the reactor cavity by means of circulation conduits for raising and discharging the lead coolant, the
(Continued)

steam generators and most of the circulation conduits and are arranged higher than the level of the lead coolant within the reactor cavity, and the circulation pumps are arranged within the reactor cavity on the circulation conduits and for raising the "hot" lead coolant, and a technical means is provided for ensuring natural circulation of the lead coolant through the reactor core when the circulation pumps are switched off. The specific volume of lead coolant per unit of power of the reactor is reduced and the safety of the reactor is increased.

1 Claim, 2 Drawing Sheets

(51) Int. Cl.
*G21C 15/247* (2006.01)
*G21C 15/26* (2006.01)
*G21C 15/28* (2006.01)
*G21C 15/02* (2006.01)
*G21C 15/253* (2006.01)
*F22B 1/06* (2006.01)

(52) U.S. Cl.
CPC ............ *G21C 15/253* (2013.01); *G21C 15/26* (2013.01); *G21C 15/28* (2013.01); *F22B 1/063* (2013.01); *G21Y 2002/50* (2013.01); *G21Y 2004/302* (2013.01); *G21Y 2004/40* (2013.01); *Y02E 30/34* (2013.01); *Y02E 30/35* (2013.01)

(58) Field of Classification Search
CPC .. G21C 15/243; G21C 15/247; G21C 15/257; G21C 15/26; F22B 1/063
See application file for complete search history.

(56) References Cited

OTHER PUBLICATIONS

Written Opinion of the ISA for PCT/RU2014/000896, ISA/RU, with English translation, mailed Apr. 16, 2015.

* cited by examiner

REACTOR SYSTEM WITH A LEAD-COOLED FAST REACTOR

CROSS-REFERENCE TO RELATED APPLICATIONS

This application is a 371 U.S. National Stage of International Application No. PCT/RU2014/000896, filed Nov. 27, 2014, which claims the benefit of and priority to Russian Patent Application No. RU 2014103269, filed Jan. 31, 2014. The entire disclosures of each the above applications are incorporated by reference herein.

TECHNICAL FIELD

The present invention relates to nuclear technology and is intended for use in power-generating systems with a fast reactor cooled with liquid-metal coolant which is primarily in the form of molten lead or an alloy thereof.

BACKGROUND OF THE INVENTION

Long-term development of nuclear energetics is associated with production of fast power reactors that can allow solving crucial problems of effective and safe usage of nuclear fuel upon closure of the nuclear fuel cycle and providing environmental safety. Ongoing efforts include the development of new generation lead-cooled fast reactors having nitride uranium-plutonium fuel. Such reactors show fundamental advantages over the thermal reactors and sodium-cooled fast reactors and can create the basis for development of power plants characterised in high level of reliability, safety and substantially unlimited fuel supply. (The next generation of fast reactors/E. O. Adamov, V. V. Orlov, A. I. Filin, V. N. Leonov, A. G. Sila-Novitsky, V. S. Smirnov, V. S. Tsikunov//Nuclear Engineering and Design.—1997.—Vol. 173, No 1-3.—P. 143-150).

There are engineering and design elaborations of a pool reactor system having master equipment of integral-loop-type based on liquid-lead-cooled fast reactor, described in the experimental test project of the reactor system BREST-OD-300 (V. N. Leonov, A. A. Pikalov, A. G. Sila-Novitsky et al. Design and layout solutions of major components and equipments of the reactor BREST-OD-300//Problems of Atomic Science and Technology. Series: Nuclear Physics Investigations, N 4, Moscow, State Unitary Enterprise Research and Development Institute of Power Engineering (NIKIET), 2004, p. 65-72).

The system includes a reinforced concrete cavity having an inner steel cladding, a reactor vessel unit with an upper cover, an active zone, an actuating mechanism system controlling the active zone reactivity, steam generators and main circulation pumps, a system of mass-transfer devices and filters for coolant purification, a refuelling system for active zone components, a process parameter monitoring system and other auxiliary systems. The vessel unit of the BREST-OD-300 reactor system comprises one central and four peripheral flat-bottomed tubular cavities which together with the upper cover define a primary circuit boundary of the reactor system where circulating therein coolant removes heat from the active zone, the volume of cover gas is generated and intrareactor devices and equipment are arranged. The active zone is arranged within the central cavity of the vessel unit, and steam generator units are arranged within four peripheral cavities connected to the central cavity by means of upper and lower pipes. Each steam generator has the form of a tubular heat exchanger for heating water (steam) of supercritical parameters which is immersed into the lead coolant flow circulating in a space between the pipes of the steam generator shell in the top-to-bottom direction. In the case of pipe leakage and steam flowing into the lead coolant circulation circuit, the steam generator switching off is provided by means of cutting off the feed-water and main-steam supply conduits in a secondary circuit. Lead coolant circulation within the reactor BREST-OD-300 is provided by means of pumping said coolant with circulation pumps out of a steam generator cavity to the level of a pressure chamber of the reactor, wherefrom said coolant descends to an active zone inlet chamber, then rises and is heated in the active zone in the result of contact with fuel elements of fuel assemblies and after that enters a "hot" coolant common chamber. Further, the coolant flows into the inlet chambers and the space between pipes of steam generators, is cooled down and is transferred to the circulation pump inlets; after which it is again supplied into the reactor pressure chamber.

The disclosed system structure is intended for providing a test reactor BREST-OD-300 and checking technical solutions that may be used in the development of new generation lead-cooled fast power reactors. Such reactors comprise master equipment of integral-loop-type which has large dimensions and high specific weight of used lead coolant per unit of output power. For instance, for the BREST-1200 reactor this factor is 1.4 $m^3$/MW and more, which depends on unit power of the master equipment and layout arrangements.

As the closest solution was chosen a pool-type nuclear power system having master equipment of integral-loop-type based on a lead-cooled fast reactor (Ru 2247435). The system comprises a reactor arranged within a central tank, steam generators and circulation pumps arranged within peripheral tanks, and a coolant treatment system using gaseous mixtures for lead oxide recovery. The reactor, steam generators and circulation pumps are arranged under the liquid-metal-coolant free level. Steam generators of said system made in the form of a tubular heat exchanger having the pipes supplied with water (steam) and a space between the pipes where the lead coolant circulates in the top-to-bottom direction. Inside the reactor system, between the free liquid-metal-coolant level and an upper cover there is a common gaseous chamber communicated with a gas circulation and purification system.

A disadvantage of this technical solution is that the high inner pressure equipment (steam generators) is arranged within the peripheral tanks filled with molten lead. This increases the risk of accidents upon steam generator pipe integrity loss and ingression of water (steam) into coolant. Moreover, the integral-loop-type master equipment has high specific weight of used lead coolant per unit of reactor power which results in increase of reactor dimensions and capital costs for such reactor production.

SUMMARY OF THE INVENTION

The object of the invention is to improve current lead-cooled fast reactor systems, to reduce production and operational costs simultaneously providing high level of safety of such system upon its operation and in emergency conditions. This problem can be solved by creating new arrangements achieved by arranging high inner pressure steam generators externally of lead coolant and reducing the lead coolant specific volume per reactor power unit.

The inventive reactor system (comprising a reactor cavity with an upper cover, a reactor disposed within the cavity and having an active zone, steam generators, circulation pumps, circulation conduits, actuating mechanism systems and devices for starting up, operating and shutting down the reactor system) comprises steam generators in the form of tubular heat exchangers in which coolant flows within the pipes and water-steam circulates in a space between the pipes, wherein said steam generators are arranged in separate boxes and are communicated with the reactor cavity by means of circulation conduits for rising and discharging the lead coolant, and said steam generators and most of the circulation conduits are arranged higher than the level of the lead coolant within the reactor cavity, the circulation pumps are mounted within the reactor cavity on the circulation conduits for rising the "hot" lead coolant, and wherein the inventive reactor system comprises a technical means providing intrinsic circulation of the lead coolant through the active zone when the circulation pumps are switched off.

According to one particular embodiment, the technical means providing intrinsic circulation of lead coolant through an active zone when circulation pumps are switched off is in the form of holes made in the shell-ring dividing downcomer and riser sections of coolant circulation circuit within the reactor cavity.

According to another particular embodiment, the device minimizing coolant flow has the form of an auxiliary pump for pumping the coolant out of the riser section into the downcomer section of the coolant circulation circuit within the reactor cavity.

The problem addressed by the invention is to provide a semi-integral reactor system using heavy coolant in which: master equipment together with circulation pumps is arranged within a reactor cavity, steam generators are of the inverse type and are distributed among separate boxes higher than the free lead level within the reactor cavity. Such arrangement will allow increasing reliability and safety of the reactor system under normal operating conditions and in the case of emergency, as well to reduce lead coolant volume thus reducing capital costs during power generating unit construction.

EMBODIMENTS OF THE INVENTION

Figure 1:
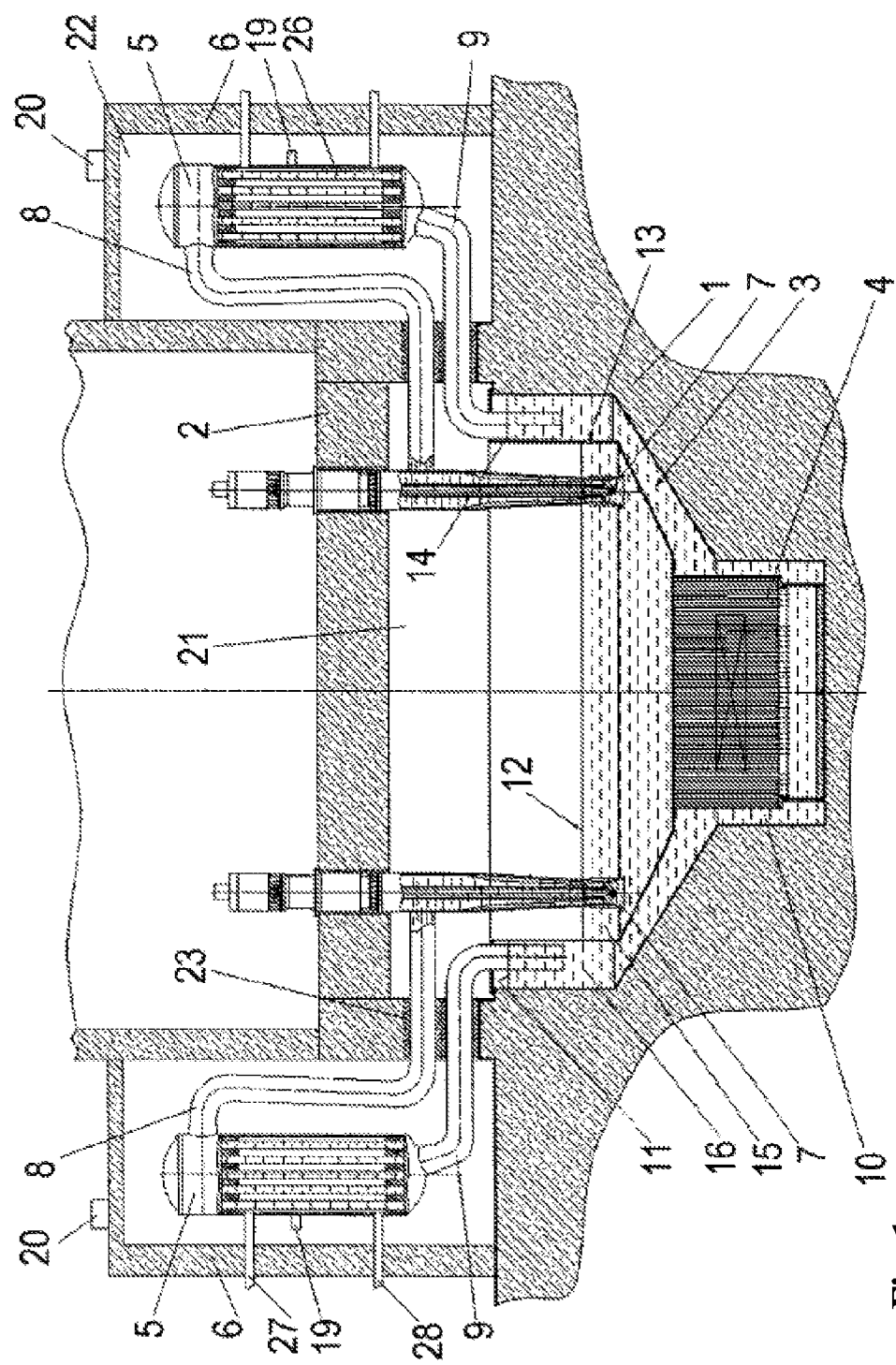
FIG. 1 is a reactor system scheme according to the present invention.

A reactor system comprises a reactor cavity (1) with an upper cover (2), an arranged within the cavity (1) reactor (3) having an active zone (4), steam generators (5) arranged within separate boxes (6), circulation pumps (7), circulation conduits (8) and (9), and actuating mechanism systems and devices for reactor for starting up, operating and emergency shutting down (not shown on the scheme). The steam generators (5) made in the form of tubular heat exchangers are communicated with the reactor cavity (1) by means of circulation conduits for rising (8) and discharging (9) lead coolant (10) and are arranged higher than the coolant "cold" level (11). Impellers of the circulation pumps (7) are mounted within the reactor cavity (1) below the lead coolant (10) "hot" level (12).

The steam generators (5) are made so that the lead coolant flows within the steam generator pipes from top to bottom. Secondary circuit water flows into a steam generator through a lower pipe (28), and steam is discharged via an upper pipe (27).

According to the particular embodiment, the system comprises a technical means for lead coolant intrinsic circulation through the active zone (4) when the circulation pumps (7) are switched off. This means can be made, for example, in the form of through-holes (13) made in a shell-ring (14) dividing a riser (15) and downcomer (16) sections of the lead coolant circulation circuit within the reactor cavity (1).

The device minimizing lead coolant flow also can be made (FIG. 3) as an auxiliary pump (18) pumping the coolant out of the riser section (15) into the downcomer section (16) of the coolant circulation circuit within the reactor cavity (1).

Each steam generator (5) has a steam discharge device (19) for steam discharge when the coolant temperature rises higher than the allowed level, and a steam discharge device (20) for steam discharge out of the box (6) into the atmosphere. A gaseous chamber (21) of the reactor cavity (1) and gaseous chambers (22) of the steam generator (5) boxes (6) are separated from each other by a sealed device (23).

Lead coolant circulation within the primary circuit of the reactor system is performed as follows. The coolant by means of the circulation pumps (7) is pumped out of the reactor riser section (15) via rising circulation conduits (8) into the top portion of the steam generator (5), then via the discharge circulation conduits (9) it flows into the downcomer section (16) of the lead coolant circulation circuit within the reactor cavity (1). This coolant from the downcomer circulation section (16) flows into the active zone (4) where it is heated in the result of contact with fuel element surfaces. After that, the coolant is transferred to the circulation pumps (7), thus closing the circulation circuit under normal system operating conditions.

The amount of lead coolant within the reactor cavity (1) and steam generators (5) is calculated so that in the case of circulation conduits (8) and (9) depressurization or steam generator tightness failure the lead coolant level inside the reactor cavity (1) would still be sufficient for cooling the active zone (4) by means of intrinsic circulation.

Once the circulation pumps (7) switched off, the coolant is completely discharged from the steam generators (5) into the downcomer section (16) of the coolant circulation circuit within the reactor cavity (1), flows into the active zone (4) and next into the riser section (15) of the circulation circuit. In addition, the difference between "cold" (11) and "hot" (12) coolant levels is reduced and the coolant flows from the riser section (15) of the circulation circuit into the downcomer section (16) via the through-holes (13) made in the shell-ring (14), thus closing under emergency conditions the lead coolant (10) intrinsic circulation circuit.

Figure 2:
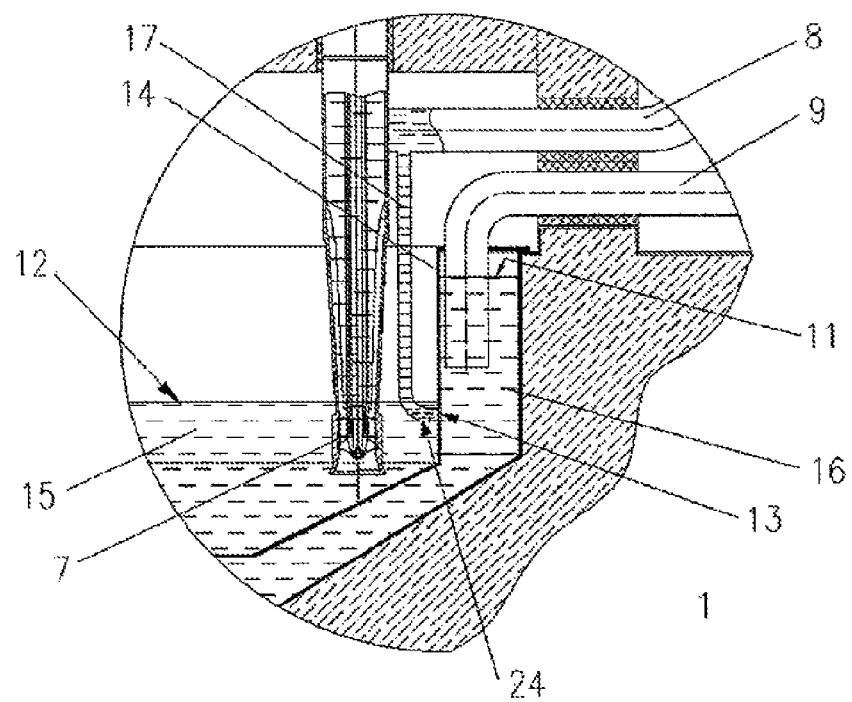
FIG. 2 is a scheme of the first embodiment of a device minimizing coolant flow in a system under normal operating conditions via holes provided for intrinsic coolant circulation when circulation pumps are switched off.

In order to compensate flowing the coolant via the holes (13) under normal operating conditions, can be used a device (FIG. 2) in the form of a bypass (17) connecting the riser section of the circulation conduit (8) with the riser section (15) of the circulation circuit via holes (24) and with the downcomer section (16) of the circulation circuit via the holes (13). When the circulation pump (7) is under operation, the major part of coolant flow rate via the holes (24) made in the bypass (17) conduit enters the section (15), and the smaller part of this flow rate is distributed into the downcomer section (16) of the circulation circuit via the holes (13). When the circulation pumps (7) are switched off and "cold" (11) and "hot" (12) levels are equalized, coolant intrinsic circulation establishes.

Figure 3:
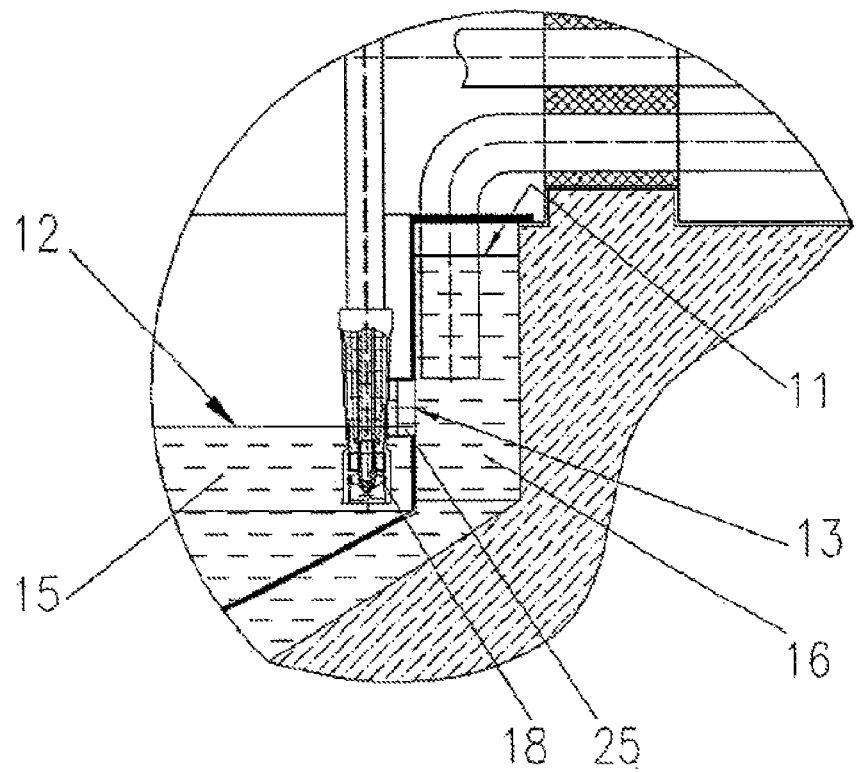
FIG. 3 is a scheme of the second embodiment of a device minimizing coolant flow in a system under normal operating conditions via holes provided for intrinsic coolant circulation when circulation pumps are switched off.

The device for coolant flow compensation, shown in FIG. 3, can be made as an auxiliary pump (18) and a conduit (25) connecting the riser (15) and downcomer (16) sections of the coolant circulation circuit via the holes (13). When the pump (18) is under operation, the pressure inside the conduit (25) increases, thus preventing the coolant to flow from the downcomer section (16) into the riser section (15) of the circulation circuit. Pumps (18) can comprise flyweights which contribute to coolant intrinsic circulation when the circulation pumps (7) are switched off.

The semi-integral structure of the system and arranging inverse steam generators (5) higher than the lead coolant level present in the cavity (1) allows the lead coolant to be fully discharged into the reactor, thus protecting the system from coolant freezing in the case of accidents accompanied with secondary circuit steam conduit ruptures, and significantly facilitating deposit washing out in the steam generator pipes.

The use in a reactor system of the inverse steam generators (5) can greatly increase the reliability thereof, since in this case steam generator pipes (26) are subjected to external pressure of secondary circuit coolant (water-steam). Also, in the case of an emergency lead coolant temperature rise upstream the steam generators (5), the pipes lose their stability and instead of being damaged (which is the case for direct heat exchangers) they collapse, thus merely completely preventing active coolant (10) flowing out the circuit boundaries and entering water-steam into the lead coolant circulation circuit. The steam generators (5) are provided with active and passive steam discharge devices which limit the accident effects and exclude the risk of environmental release of nuclear substances.

INDUSTRIAL APPLICATION

In this way, the practical use of the inventive design of the reactor system will significantly reduce the amount of lead coolant and increase the reliability and safety of the reactor system under normal operating conditions and in the case of emergency.

The invention claimed is:

1. A reactor system, comprising a reactor cavity, separate boxes, and main circulation conduits extending between the reactor cavity and the separate boxes, the reactor cavity having an upper cover and a shell-ring dividing a downcomer section and a riser section of a lead coolant circulation circuit within the reactor cavity, and disposed within the reactor cavity are a reactor having a reactor core, lead coolant having a lead coolant level in the riser and downcomer sections, and main circulation pumps for the lead coolant, and disposed within the separate boxes are steam generators, wherein the lead coolant circulates through the steam generators within pipes and water-steam circulates through the steam generators in spaces between the pipes of the steam generators, and the steam generators are arranged in the separate boxes higher than the lead coolant level of the riser and downcomer sections, the steam generators are in communication with the reactor cavity via the main circulation conduits, the main circulation pumps are mounted within the reactor cavity on the main circulation conduits to pump the lead coolant from the riser section into a top of the steam generators and through the pipes of the steam generators, and the main circulation conduits return the lead coolant discharged from the pipes of the steam generators and from a bottom of the steam generators into the downcomer section, and a device is arranged within the reactor cavity for lead coolant natural circulation through the reactor core in case the main circulation pumps are switched off, and said device has the form of holes made in the shell-ring within the reactor cavity, and a means for minimizing coolant flow through said holes when the system operates under normal operating conditions, wherein said means for minimizing coolant flow comprises auxiliary pumps and conduits in communication with the holes in the shell-ring and the auxiliary pumps being configured to provide back pressure at the holes minimizing coolant flow through the holes when the system operates under normal operating conditions.

* * * * *